United States Patent
Yamamoto

(10) Patent No.: US 8,270,673 B2
(45) Date of Patent: Sep. 18, 2012

(54) MOTION DETECTING APPARATUS

(75) Inventor: Toru Yamamoto, Daito (JP)

(73) Assignee: Sanyo Electric Co., Ltd., Moriguchi-Shi (JP)

( * ) Notice: Subject to any disclaimer, the term of this patent is extended or adjusted under 35 U.S.C. 154(b) by 181 days.

(21) Appl. No.: 12/797,981

(22) Filed: Jun. 10, 2010

(65) Prior Publication Data

US 2011/0103645 A1  May 5, 2011

(30) Foreign Application Priority Data

Jun. 10, 2009  (JP) ................................ 2009-139250

(51) Int. Cl.
*G06K 9/00* (2006.01)
(52) U.S. Cl. ......... 382/103; 382/236; 382/107; 348/699
(58) Field of Classification Search .................. 382/103, 382/107, 236; 348/699
See application file for complete search history.

(56) References Cited

U.S. PATENT DOCUMENTS

| | | | | |
|---|---|---|---|---|
| 5,247,586 | A * | 9/1993 | Gobert et al. | 382/278 |
| 6,396,538 | B1 * | 5/2002 | Kobayashi et al. | 348/240.99 |
| 2008/0056613 | A1 * | 3/2008 | Hatanaka et al. | 382/284 |

FOREIGN PATENT DOCUMENTS

| | | |
|---|---|---|
| JP | 61201587 | 9/1986 |
| JP | 61269475 A * | 11/1986 |
| JP | 06046318 | 2/1994 |
| JP | 07322126 | 8/1995 |
| JP | 09062847 | 3/1997 |

OTHER PUBLICATIONS

S. Erturk, Digital Image Stabilization with Sub Image Correlation Based Global Mostion Estimation, Nov. 2003. IEEE, vol. 49, No. 4.*
Sheng-Che Hsu, A Robust Digital Image Stabilization Techniquw Based on Inverse Triangle Method and Background Detection, IEEE.*

* cited by examiner

*Primary Examiner* — Nitin Patel
*Assistant Examiner* — Totam Le
(74) *Attorney, Agent, or Firm* — NDQ&M Watchstone LLP

(57) ABSTRACT

A motion detecting includes a fetcher which repeatedly fetches an object scene image having a designated resolution. An assigner assigns a plurality of areas each of which has a representative point to the object scene image in a manner to have an overlapping amount different depending on a size of the designated resolution. A divider divides each of a plurality of images respectively corresponding to the plurality of areas assigned by the assigner, into a plurality of partial images, by using the representative points as a base point. A detector detects a difference in brightness between a pixel corresponding to the representative point and surrounding pixels, from each of the plurality of partial images divided by the divider. A creator creates motion information indicating a motion of the object scene image fetched by the fetcher, based on a detection result of the detector.

7 Claims, 13 Drawing Sheets

(A) MOTION DETECTION BLOCK (B) MINUTE BLOCK

● REPRESENTATIVE PIXEL (A) ELECTRONIC ZOOM MAGNIFICATION = 1.0

(B) ELECTRONIC ZOOM MAGNIFICATION = 1.25

(C) ELECTRONIC ZOOM MAGNIFICATION = 1.5

(A) ELECTRONIC ZOOM MAGNIFICATION = 1.0 TIMES (B) ELECTRONIC ZOOM
   MAGNIFICATION = 1.25 TIMES (C) ELECTRONIC ZOOM
   MAGNIFICATION = 1.5 TIMES

MOTION DETECTING APPARATUS

CROSS REFERENCE OF RELATED APPLICATION

The disclosure of Japanese Patent Application No. 2009-139250, which was filed on Jun. 10, 2009, is incorporated herein by reference.

BACKGROUND OF THE INVENTION

1. Field of the Invention

The present invention relates to a motion detecting apparatus. More particularly, the present invention relates to a motion detecting apparatus which is applied to a video camera and which detects a motion of an object scene with reference to a repeatedly fetched object image.

2. Description of the Related Art

According to one example of this type of apparatus, in order to detect a motion of a subject, four detection blocks, each of which has a representative point are assigned to an imaging surface. In each of the detection blocks, correlation values of a plurality of pixels forming a current field are calculated with reference to the representative pixel of a previous field. A motion vector expressing the motion of the subject is created based on the thus calculated correlation values. Herein, the four detection blocks are assigned to the imaging surface in a respectively overlapping manner. Thereby, even when the size of the subject is small, it is possible to highly accurately execute a motion correcting process such as a subject tracking.

However, in the above-described apparatus, a variation in resolution of image data is not assumed, and when the resolution of the image data is varied, there is a possibility that a motion detecting capability is decreased.

SUMMARY OF THE INVENTION

A motion detecting apparatus according to the present invention, comprises: a fetcher which repeatedly fetches an object scene image having a designated resolution; an assigner which assigns a plurality of areas, each of which has a representative point to the object scene image, in a manner to have an overlapping amount different depending on a magnitude of the designated resolution; a divider which divides each of a plurality of images respectively corresponding to the plurality of areas assigned by the assigner, into a plurality of partial images, by using the representative point as a base point; a detector which detects a difference in brightness between a pixel corresponding to the representative point and surrounding pixels, from each of the plurality of partial images divided by the divider; and a creator which creates motion information indicating a motion of the object scene image fetched by the fetcher, based on a detection result of the detector.

The above described features and advantages of the present invention will become more apparent from the following detailed description of the embodiment when taken in conjunction with the accompanying drawings.

DETAILED DESCRIPTION OF THE PREFERRED EMBODIMENTS

Figure 1:
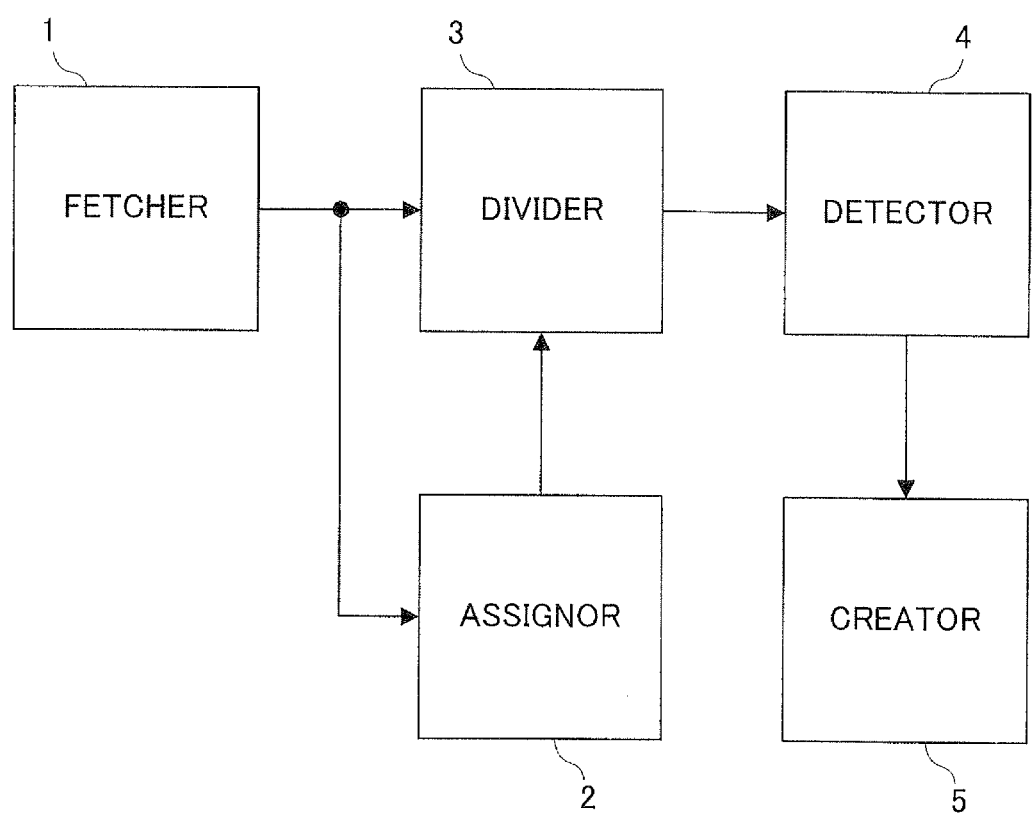
FIG. 1 is a block diagram showing a basic configuration of one embodiment of the present invention.

With reference to FIG. 1, a motion detecting apparatus of one embodiment of the present invention is basically configured as follows: A fetcher 1 repeatedly fetches an object scene image having a designated resolution. An assigner 2 assigns a plurality of areas each of which has a representative point to the object scene image in a manner to have an overlapping amount different depending on a magnitude of the designated resolution. A divider 3 divides each of a plurality of images respectively corresponding to the plurality of areas assigned by the assigner 2, into a plurality of partial images, by using the representative point as a base point. A detector 4 detects a difference in brightness between a pixel corresponding to the representative point and surrounding pixels, from each of the plurality of partial images divided by the divider 3. A creator 5 creates motion information indicating a motion of the object scene image fetched by the fetcher 1, based on a detection result of the detector 4.

Each of the plurality of images respectively corresponding to the plurality of areas is divided into the plurality of partial images, by using each of the representative points as the base point, and the difference in brightness between the pixel corresponding to the representative point and the surrounding pixels is detected from each of the partial images. In this way, a situation in which a load charged on the detection of the difference in brightness increases caused due to an increase in overlapping amount of the plurality of areas can be avoided. Thereby; it becomes possible to inhibit a decrease in motion detecting capability caused due to variation in resolution.

Figure 2:
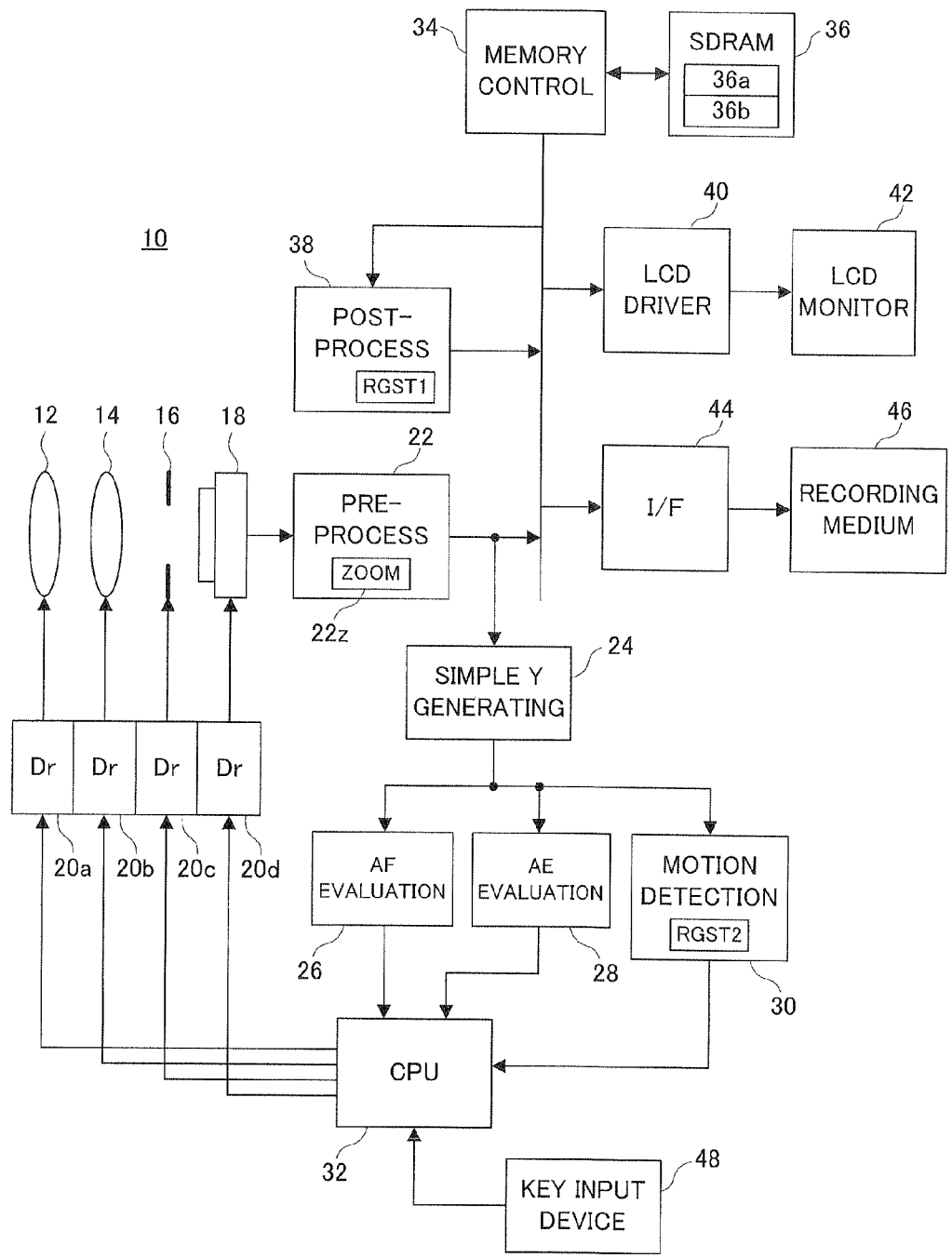
FIG. 2 is a block diagram showing a configuration of one embodiment of the present invention.

With reference to FIG. 2, a digital video camera 10 according to this embodiment includes a zoom lens 12, a focus lens 14, and an aperture unit 16 driven by drivers 20a, 20b, and 20c, respectively. An optical image of an object scene enters, with irradiation, an imaging surface of an image sensor 18 through these members. The imaging surface is covered with a primary color filter (not shown) having a Bayer array. Therefore, in each pixel, electric charges having any one of color information, i.e., R (Red), G (Green), and B (Blue), are produced by photoelectric conversion.

When a power source is turned on, a CPU 32 starts a driver 20d in order to execute a moving-image fetching process. In response to a vertical synchronization signal Vsync, generated at every 1/60th of a second, the driver 20d exposes the imaging surface and reads out electric charges produced on the imaging surface in a raster scanning manner. From the image sensor 16, raw image data representing the object scene is outputted at a flume rate of 60 fps.

A pre-processing circuit 22 performs various processes, such as digital clamp, pixel defect correction, electronic zoom, and gain control, on the raw image data from the image sensor 18, and outputs raw image data having a resolution corresponding to an electronic zoom magnification. Herein, the electronic zoom process is executed by, in particular, a zoom circuit 22z. The raw image data outputted from the pre-processing circuit 22 is written into a raw image area 36a of an SDRAM 36 through a memory control circuit 34.

Figure 3:
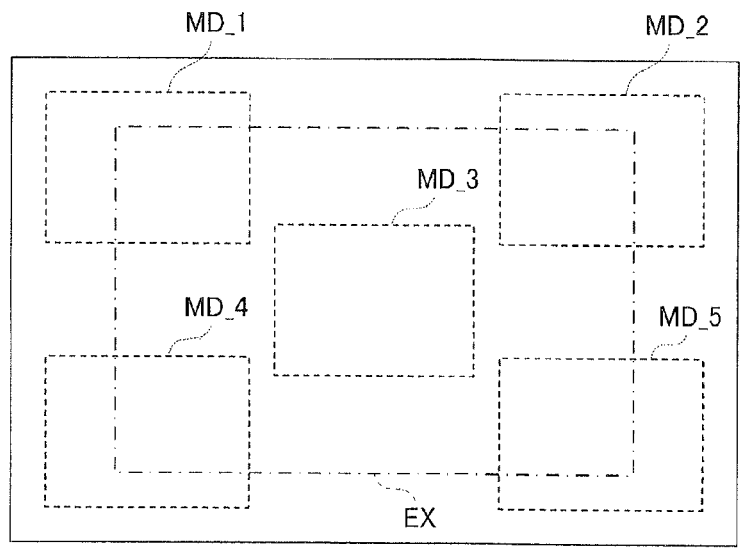
FIG. 3 is an illustrative view showing one example of a state in which a plurality of motion detection blocks and a single extraction area are assigned to an imaging surface.

When the object scene image corresponding to the raw image data outputted from the pre-processing circuit 22 has expansion shown in FIG. 3, an extraction area EX is assigned to this object scene image as shown in FIG. 3. Attributes (attributes: size and location. Hereinafter, the same applies.) of such an extraction area EX are written onto a register RGST1.

A post-processing circuit 38 detects the attributes of the extraction area EX with reference to the register RGST1, reads out the portion of the raw image data belonging to the extraction area EX, out of the raw image data accommodated in the raw image area 36a, through the memory control circuit 34 at every 1/60th of a second, and performs various processes, such as color separation, white balance adjustment, and YUV conversion, on the read-out raw image data. As a result, image data corresponding to a YUV format is created at every 1/60th of a second. The created image data is written into a YUV image area 36b of the SDRAM 36 through the memory control circuit 34.

An LCD driver 40 repeatedly reads out the image data accommodated in the YUV image area 36b, executes an electronic zoom process in which a difference in resolution between the read-out image data and an LCD monitor 42 is taken into consideration, and drives the LCD monitor 42 based on the image data on which the electronic zoom process has been performed. As a result, a real-time moving image (through image) representing the object scene is displayed on a monitor screen.

A simple Y generating circuit 24 simply converts the raw image data outputted from the pre-processing circuit 22 into Y data. The converted Y data is applied to an AF evaluating circuit 26, an AE evaluating circuit 28, and a motion detecting circuit 30.

From the Y data outputted from the simple Y generating circuit 24, the AF evaluating circuit 26 integrates a high-frequency component of a portion of the Y data belonging to the evaluation area (not shown) at every 1/60th of a second, and applies the integrated value, i.e., a focus evaluation value, to the CPU 32. Based on the applied focus evaluation value, the CPU 32 executes a so-called continuous AF process, and places a focus lens 14 at a focal point. As a result, the clarity of the moving image outputted from the LCD monitor 42 is improved continuously.

From the Y data outputted from the simple Y generating circuit 24, the AE evaluating circuit 28 integrates a portion of the Y data belonging to the evaluation area at every 1/60th of a second, and outputs the integrated value, i.e., a luminance evaluation value. Based on the luminance evaluation value outputted from the AE evaluating circuit 28, the CPU 32 calculates an EV value from which an appropriate exposure amount can be obtained, and sets an aperture amount and an exposure time that define the calculated EV value, to the drivers 20c and 20d, respectively. As a result, the brightness of the moving image outputted from the LCD monitor 42 is adjusted moderately.

When a zoom operation is performed toward a key input device 48, the CPU 32 calculates a target zoom magnification under a zoom control task. The target zoom magnification is calculated with reference to the zoom magnification at the current time point and a zoom operating manner.

The CPU 32 invalidates the zoom operation when the calculated target zoom magnification is impossible to set while adjusting the zoom magnification by using the zoom lens 12 or the zoom circuit 22z when the calculated target zoom magnification is possible to set.

When it is possible to adjust the zoom magnification by an optical zoom process, a position of the zoom lens 12 is adjusted to match the target zoom magnification. When it is not possible to adjust the zoom magnification by the optical zoom process, the electronic zoom magnification set to the zoom circuit 22z is adjusted to the target zoom magnification. Thereby, the magnification of the moving image outputted from the LCD monitor 42 is changed. It is noted that an upper limit value of the electronic zoom magnification is "1.5".

When a recording start operation is performed toward the key input device 48, the CPU 32 starts up an I/F 44 under an imaging task in order to start a recording process. The I/F 44 reads out the image data accommodated in the YUV image area 36b at every 1/60th of a second, and writes the read-out image data into a moving image file within a recording medium 46. In this case, that image data is in a compressed state. The I/F 44 is stopped by the CPU 32 when a recording end operation is performed toward the key input device 32. As a result, the recording process of the image data is ended.

As described above, the object scene image corresponding to the raw image data outputted from the pre-processing circuit 22 has expansion shown in FIG. 3, and five motion detection blocks MD_1 to MD_5 are additionally assigned to the object scene image. Attributes of such motion detection blocks MD_1 to MD_5 are written onto a register RGST2.

According to FIG. 3, the motion detection blocks MD_1 and MD_2 are placed at an upper level of the object scene image in a manner to be aligned in a horizontal direction, the motion detection block MD_3 is placed at a center of the object scene image, and the motion detection blocks MD_4 and MD_5 are placed at a lower level of the object scene image in a manner to be aligned in a horizontal direction.

The motion detecting circuit 30 detects the motion information of the object scene in each of the motion detection blocks MD_1 to MD_5 at every 1/60th of a second based on the Y data outputted from the simple Y generating circuit 24, and applies the detected motion information to the CPU 32. The CPU 32 executes the following processes under an image stabilizing task.

Figure 4:
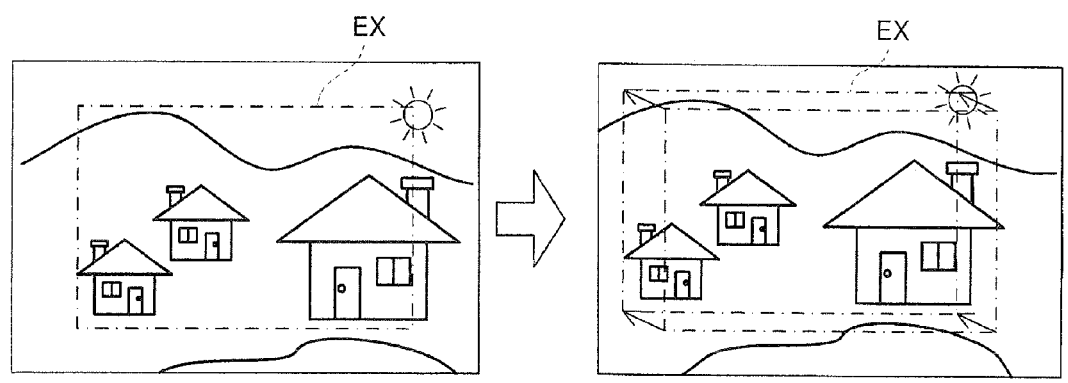
FIG. 4 is an illustrative view showing one example of image stabilizing behavior.

That is, the CPU 32 creates a total motion vector based on the applied motion information, and determines whether a motion on the imaging surface in a direction orthogonal to an optical axis is caused either by a camera shake or a pan/tilt movement based on the created total motion vector. When the motion on the imaging surface is caused due to the camera shake, the CPU 32 updates the description in the register RGST1 so that the extraction area EX is assigned to a position at which the total motion vector is compensated. Therefore, if the camera shake occurs on the imaging surface, then the extraction area EX moves on the imaging surface as shown in FIG. 4. As a result, the shaking of the moving image outputted from the LCD monitor 42 is restrained.

Figure 5:
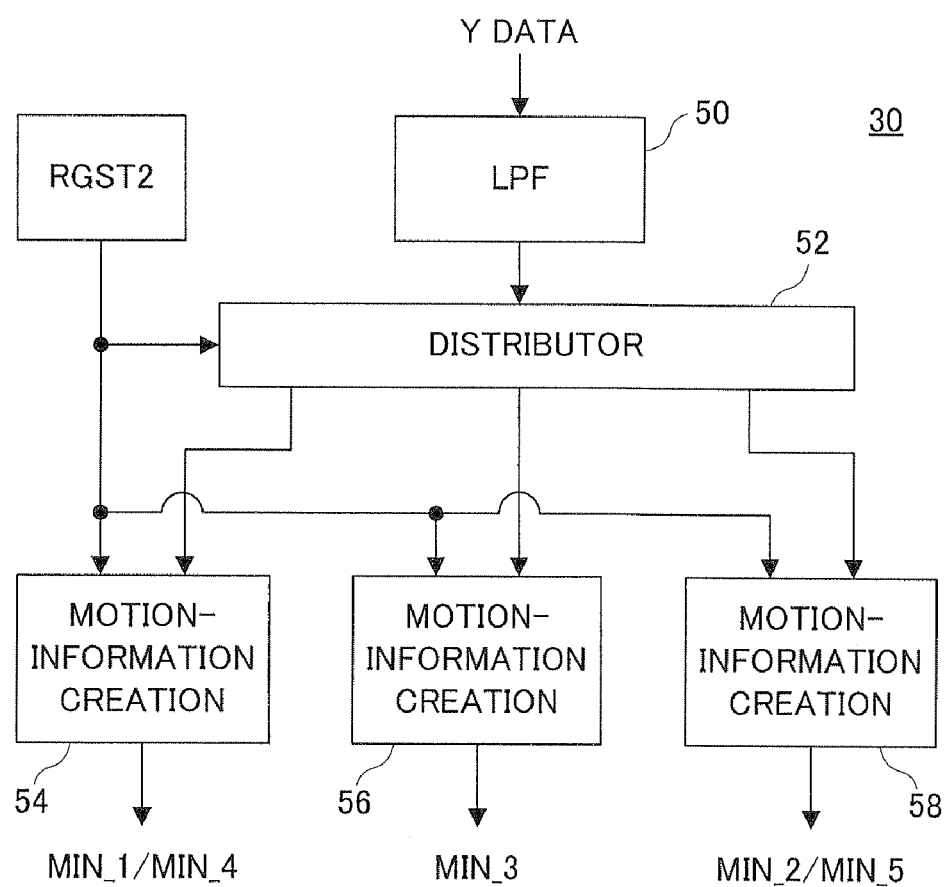
FIG. 5 is a block diagram showing one example of a configuration of a motion detecting circuit applied to the embodiment in FIG. 1.

The motion detecting circuit 30 is configured as shown in FIG. 5. The raw image data is outputted from the image sensor 18 in a raster scanning manner, and therefore, the Y data is inputted into the motion detecting circuit 30 also in a raster scanning manner. The inputted Y data is subjected to a noise removal process by an LPF 50, and then, the resultant Y data is applied, as Y_L data, to a distributor 52.

The distributor 52 detects the attributes of the motion detection blocks MD_1 and MD_5 with reference to the register RGST2, and distributes Y_L data to motion-information creating circuits 54 to 58. The Y_L data belonging to the motion detection blocks MD_1 and MD_4 are applied to the motion-information creating circuit 54, the Y_L data belonging to the motion detection block MD_3 is applied to the motion-information creating circuit 56, and the Y_L data belonging to the motion detection blocks MD_2 and MD_5 are applied to the motion-information creating circuit 58.

The motion-information creating circuit 54 notices the motion of the object scene captured in each of the motion detection blocks MD_1 and MD_4, outputs a minimum correlation value MIN_1 (described later) as motion information of the motion detection block MD_1, and at the same time, outputs a minimum correlation value MIN_4 (described later) as motion information of the motion detection block MD_4.

The motion-information creating circuit 56 notices the motion of the object scene captured in the motion detection block MD_3, outputs a minimum correlation value MIN_3 (described later) as motion information of the motion detection block MD_3.

The motion-information creating circuit 58 notices the motion of the object scene captured in each of the motion detection blocks MD_2 and MD_5, outputs a minimum correlation value MIN_2 (described later) as motion information of the motion detection block MD_2, and at the same time, outputs a minimum correlation value MIN_5 (described later) as motion information of the motion detection block MD_5.

Figure 6:
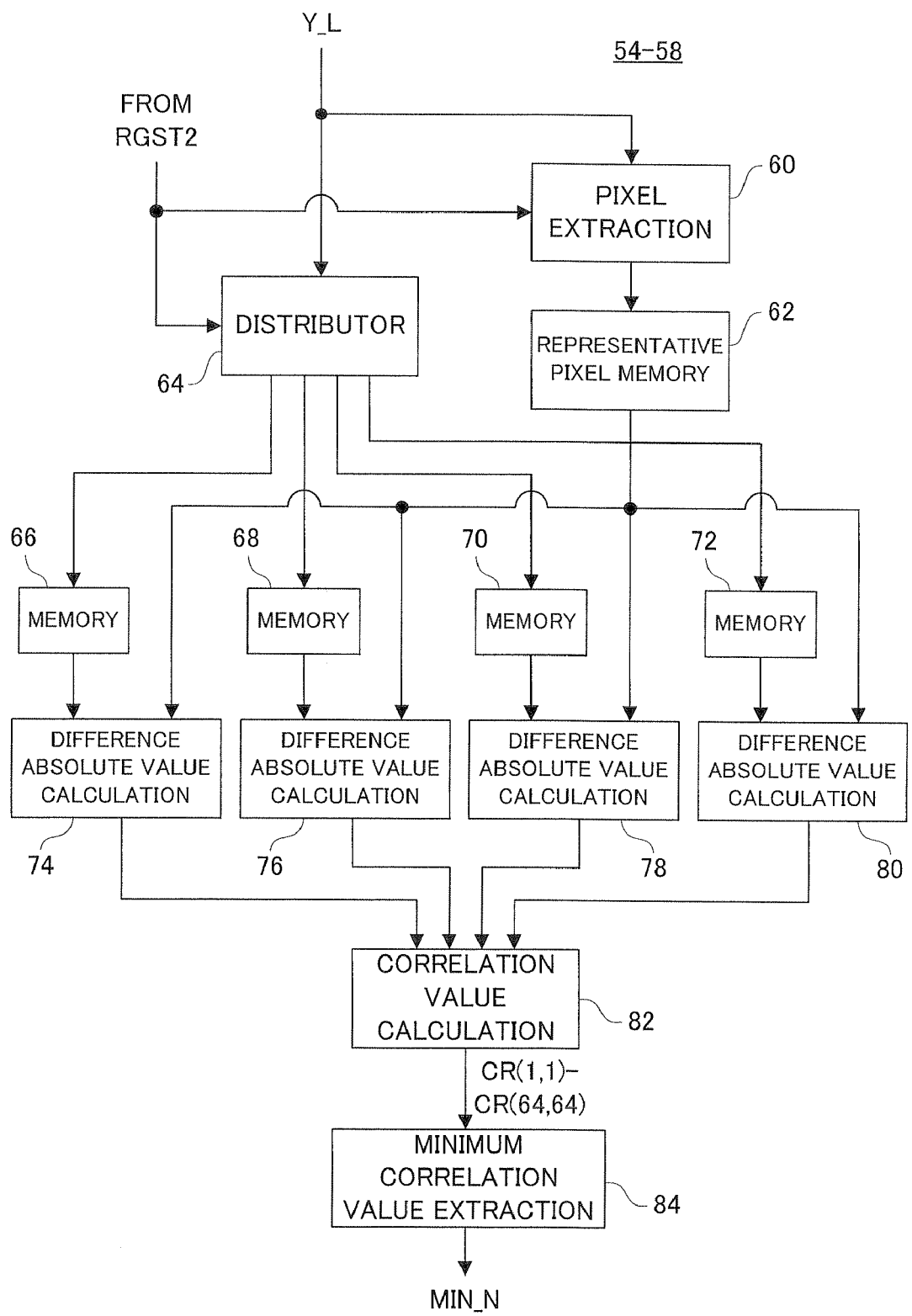
FIG. 6 is a block diagram showing one example of a configuration of a motion-information creating circuit applied to the embodiment in FIG. 5.
Figure 7:
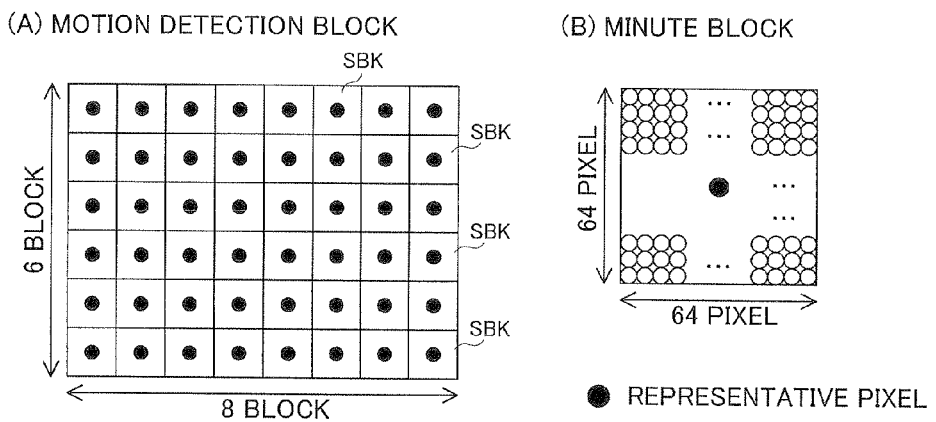
FIG. 7(A) is an illustrative view showing one example of a configuration of a motion detection block.
FIG. 7(B) is an illustrative view showing one example of a configuration of a minute block.

Each of the motion-information creating circuits 54 to 58 is configured as shown in FIG. 6. The Y_L data is applied to a pixel extracting circuit 60 and a distributor 64. With reference to FIG. 7(A), each of the motion detection blocks MD_1 to MD_5 is formed by 48 (=horizontal 8×vertical 6) minute blocks SBK, SBK, . . . . Each minute block SBK is equivalent to a rectangle block having a horizontal side and a vertical side, and is arrayed in a horizontal direction and a vertical direction of the object scene image.

Furthermore, with reference to FIG. 7(B), each of the minute blocks SBK is formed by 4096 pixels (=horizontal 64 pixels×vertical 64 pixels). Moreover, at a center of each minute block SBK, a single representative pixel (=representative point) is arranged. A manner of assigning such minute blocks SBK, SBK, . . . is written onto the register RGST2.

Returning to FIG. 6, the pixel extracting circuit 60 refers to the register RGST2 so as to specify 48 representative pixels, and extracts Y_L data of the specified representative pixels from the minute blocks SBK, SBK, . . . . The extracted Y_L data is written into a representative pixel memory 62.

Figure 8:
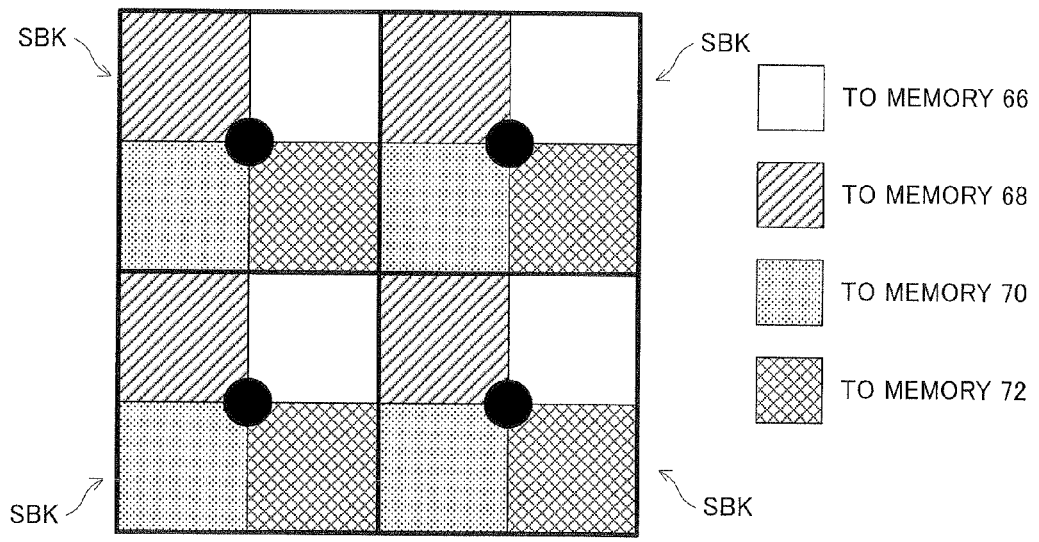
FIG. 8 is an illustrative view showing one example of behavior of a distributor applied to the embodiment of FIG. 6.

On the other hand, the distributor 64 defines a horizontal axis and a vertical axis (where the origin is the representative pixel) in each of the minute blocks SBK, SBK, SBK, . . . specified by referring to the register RGST2, and distributes the Y data belonging to a first quadrant to a fourth quadrant to memories 66 to 72. As shown in FIG. 8, the Y_L data in the first quadrant is written into the memory 66, the Y_L data in the second quadrant is written into the memory 68, the Y_L data in the third quadrant is written into the memory 70, and the Y_L data in the fourth quadrant is written into the memory 72. That is, an image corresponding to each minute block SBK is divided into four partial images (where the representative pixel is the base point).

Each of difference-absolute-value calculating circuits 74 to 80 calculates a difference absolute value between a Y_L data value of each pixel of a current frame stored in each of the memories 66 to 72 and a Y_L data value of the representative pixel of a previous frame stored in the representative pixel memory 62, corresponding to each of the minute blocks SBK, SBK, . . . .

From the difference-absolute-value calculating circuit 74, a difference absolute value between the Y_L data value of each pixel belonging to the first quadrant and the Y_L data value of the representative pixel is outputted, and from the difference-absolute-value calculating circuit 76, a difference absolute value between the Y_L data value of each pixel belonging to the second quadrant and the Y_L data value of the representative pixel is outputted. Similarly, from the difference-absolute-value calculating circuit 78, a difference absolute value between the Y_L data value of each pixel belonging to the third quadrant and the Y_L data value of the representative pixel is outputted, and from the difference-absolute-value calculating circuit 80, a difference absolute value between the Y_L data value of each pixel belonging to the fourth quadrant and the Y_L data value of the representative pixel is outputted.

Figure 9:
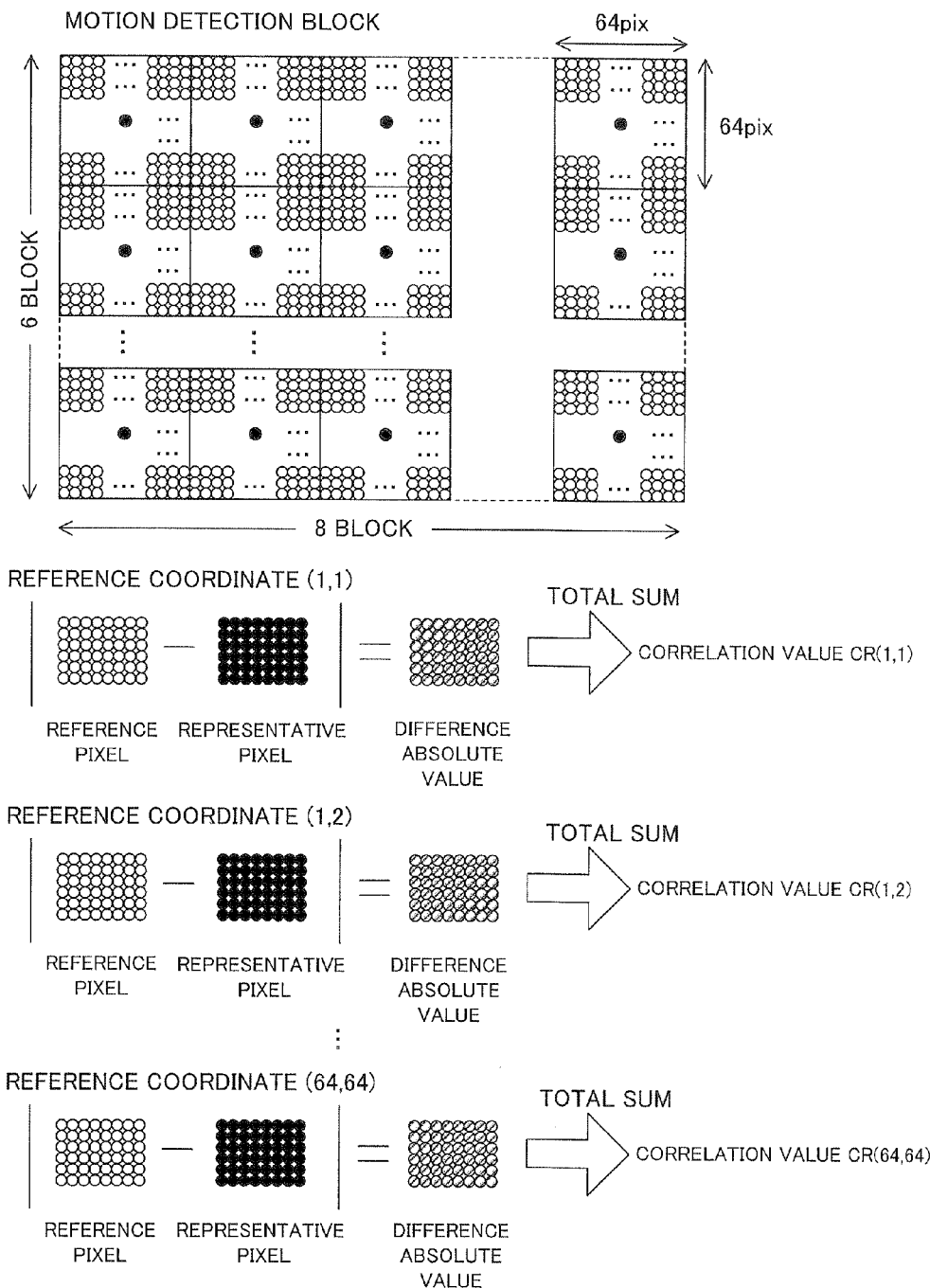
FIG. 9 is an illustrative view showing a portion of behavior of the embodiment in FIG. 6.

With reference to FIG. 9, each of the motion detection blocks MD_1 to MD_5 is configured by the 48 minute blocks SBK, SBK, . . . , and each minute block SBK is configured by horizontal 64 pixels×vertical 64 pixels. Thus, corresponding to each pixel of the coordinates (1, 1) to (64, 64), 48 difference absolute values are acquired.

A correlation-value calculating circuit 82 shown in FIG. 6 calculates a total sum of the 48 difference absolute values corresponding to the pixel placed in the coordinates (1, 1), as a correlation value CR (1, 1), and calculates a total sum of the 48 difference absolute values corresponding to the pixel placed in the coordinates (1, 2), as a correlation value CR (1, 2). Similarly, the correlation-value calculating circuit 82 calculates a total sum of the 48 difference absolute values corresponding to the pixel placed in the coordinates (64, 64), as a correlation value CR (64, 64).

A minimum-correlation-value extracting circuit 84 extracts a correlation value indicating a minimum value, out of the previously-calculated correlation values CR (1, 1) to CR (64, 64), and outputs the extracted correlation value as a minimum correlation value MIN N (N: any one of 1 to 5).

The CPU 32 updates the description of the registers RGST1 and RGST2 when the electronic zoom magnification is changed under the zoom control task.

Figure 10:
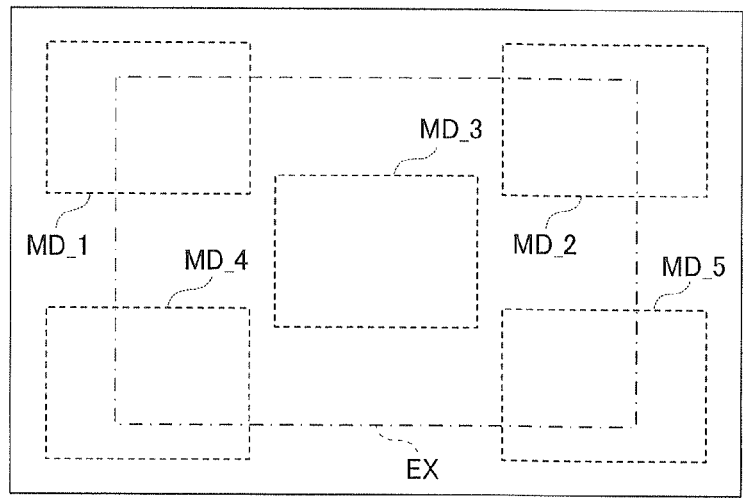
FIG. 10(A) is an illustrative view showing a state in which the plurality of motion detection blocks and the single extraction area are assigned when an electronic zoom magnification is set to "1.0"
FIG. 10(B) is an illustrative view showing a state in which the plurality of motion detection blocks and the single extraction area are assigned when the electronic zoom magnification is set to "1.25"
FIG. 10(C) is an illustrative view showing a state in which the plurality of motion detection blocks and the single extraction area are assigned when the electronic zoom magnification is set to "1.5"
Figure 10:
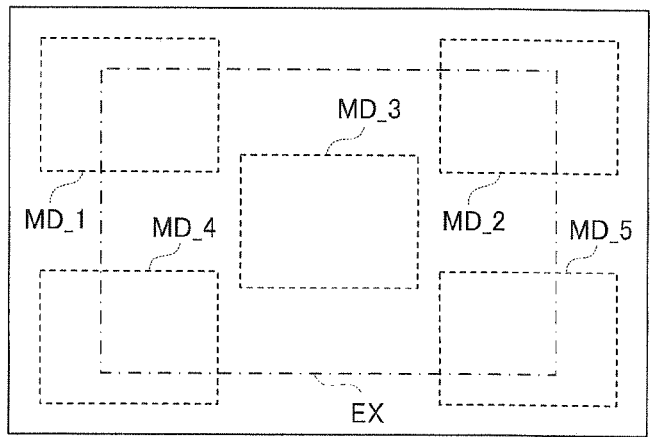
Figure 10:
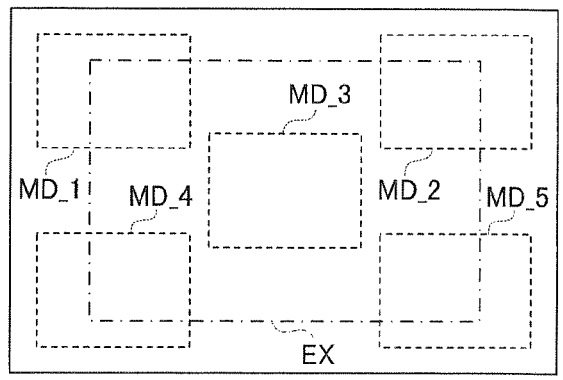

The size of the extraction area EX described in the register RGST1 is adjusted to a size shown in FIG. 10 (A), corresponding to an electronic zoom magnification of "1.0", adjusted to a size shown in FIG. 10(B), corresponding to an electronic zoom magnification of "1.25", adjusted to a size shown in FIG. 10(C), corresponding to an electronic zoom magnification of "1.5".

Moreover, the sizes of the motion detection areas MD_1 to MD_5 described in the register RGST2 are adjusted to sizes shown in FIG. 10(A), corresponding to an electronic zoom magnification of "1.0", adjusted to sizes shown in FIG. 10(B), corresponding to an electronic zoom magnification of "1.25", and adjusted to sizes shown in FIG. 10(C), corresponding to an electronic zoom magnification of "1.5".

Figure 11:
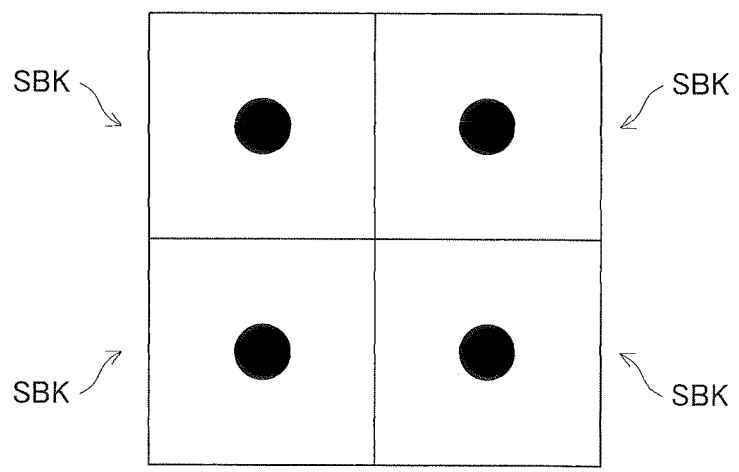
FIG. 11(A) is an illustrative view showing a state in which the minute blocks are assigned when the electronic zoom magnification is set to "1.0"
FIG. 11(B) is an illustrative view showing a state in which the minute blocks are assigned when the electronic zoom magnification is set to "1.25"
FIG. 11(C) is an illustrative view showing a state in which minute blocks are assigned when the electronic zoom magnification is set to "1.5"
Figure 11:
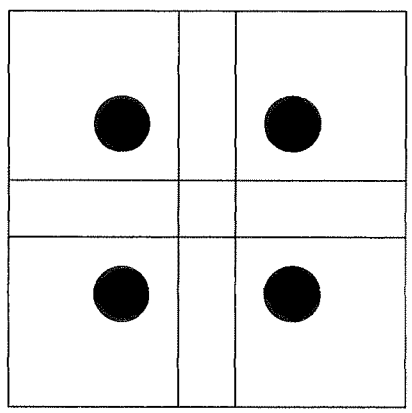
Figure 11:
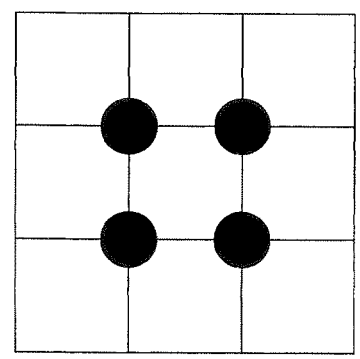

Moreover, a manner of assigning the minute block SBK described in the register RGST2 is adjusted to a manner shown in FIG. 11(A), corresponding to an electronic zoom magnification of "1.0", adjusted to a manner shown in FIG. 11(B), corresponding to an electronic zoom magnification of "1.25", and adjusted to a manner shown in FIG. 11(C), corresponding to an electronic zoom magnification of "1.5".

The minute blocks SBK, SBK, . . . adjacent in each of a horizontal direction and a vertical direction are placed not to be overlapped to one another when the electronic zoom magnification is "1.0", placed in a manner to have an overlapping amount of ¼ in each of the horizontal direction and the vertical direction when the electronic zoom magnification is "1.25", and placed in a manner to have an overlapping amount of ½ in each of the horizontal direction and the vertical direction when the electronic zoom magnification is "1.5". Thus, the overlapping amounts of the two minute blocks SBK and SBK adjacent to each other increase along with an increase in electronic zoom magnification (in other words, along with a decrease in resolution of the object scene image).

Figure 12:
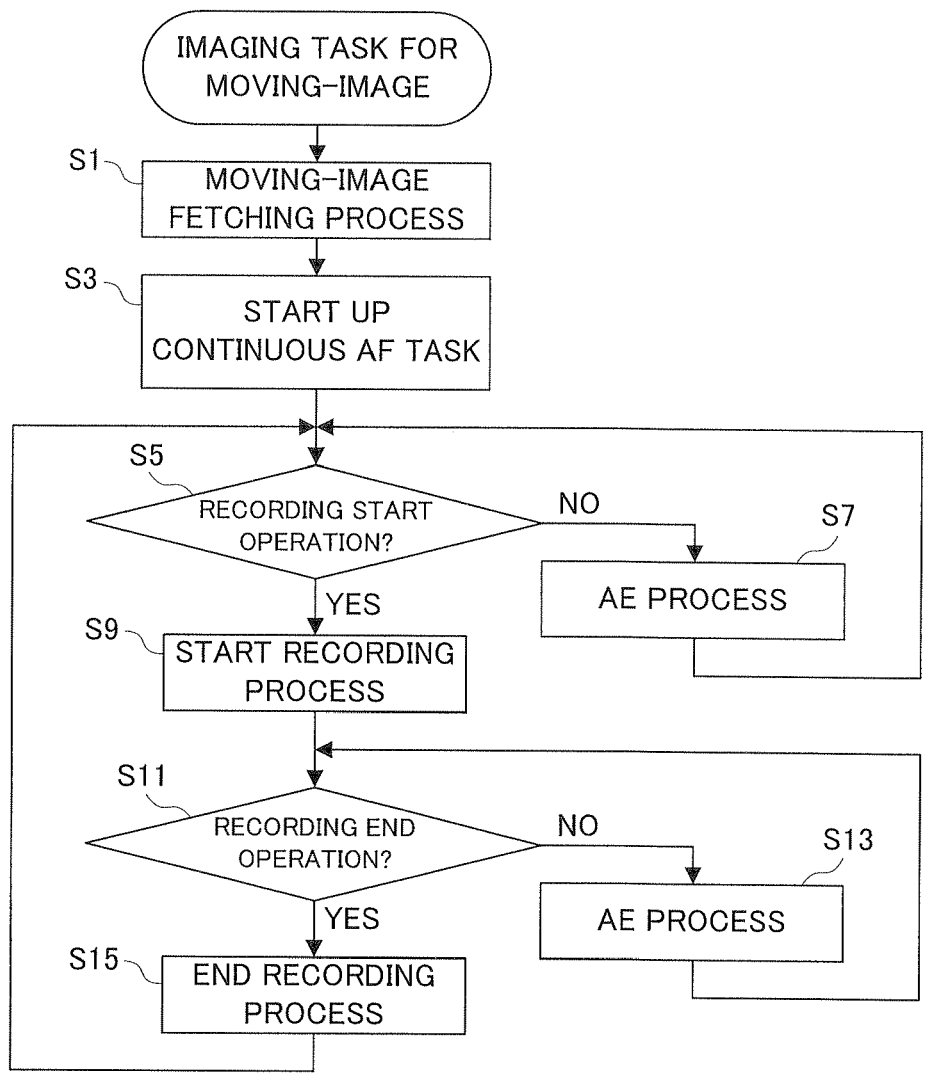
FIG. 12 is a flowchart showing one portion of an operation of a CPU applied to the embodiment in FIG. 2.
Figure 13:
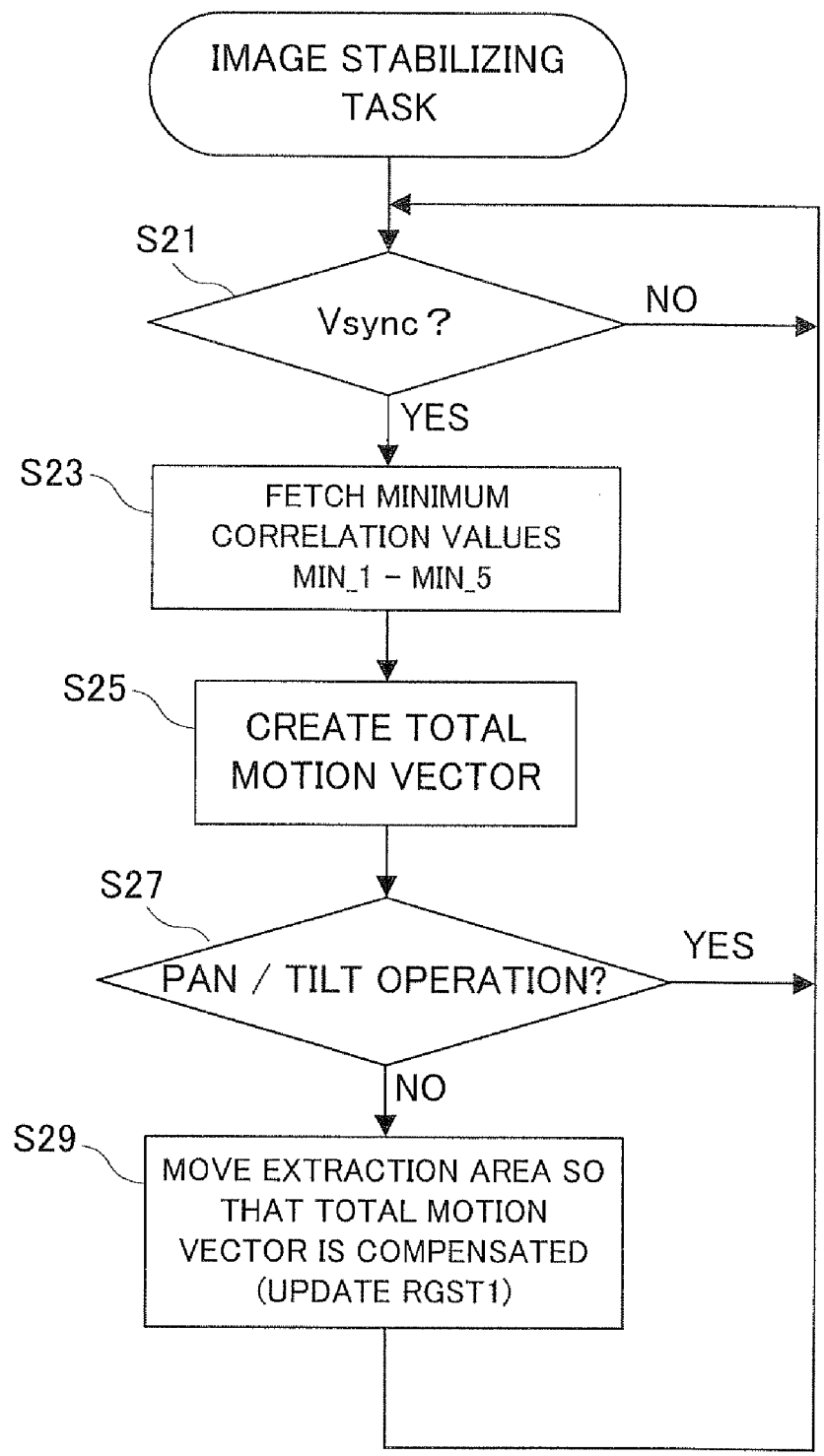
FIG. 13 is a flowchart showing another portion of the operation of the CPU applied to the embodiment in FIG. 2.
Figure 14:
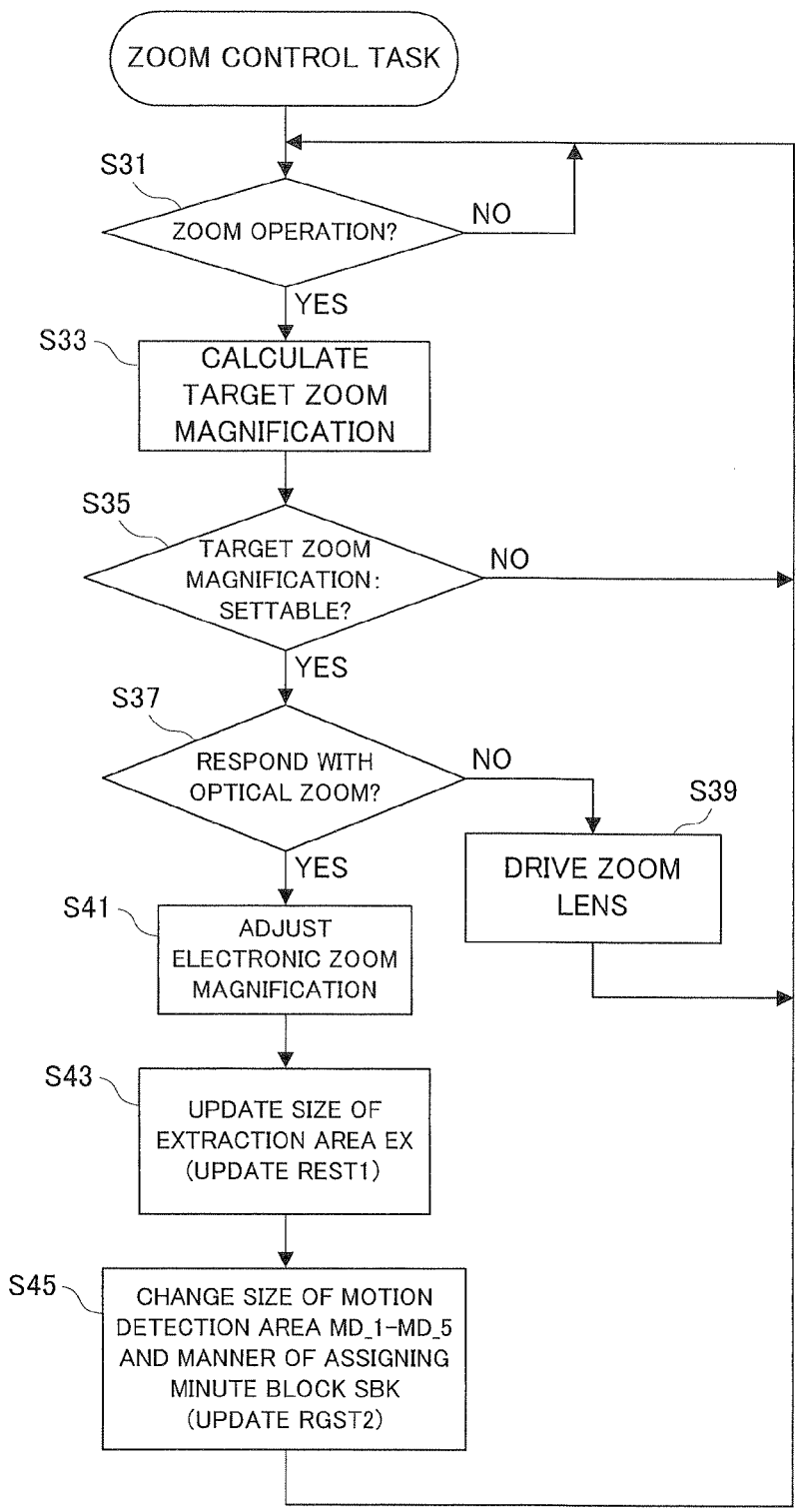
FIG. 14 is a flowchart showing still another portion of the operation of the CPU applied to the embodiment in FIG. 2.

The CPU 32 processes a plurality of tasks including an imaging task for a moving image shown in FIG. 12, an image stabilizing task shown in FIG. 13, and a zoom control task shown in FIG. 14, in a parallel manner. It is noted that control programs corresponding to these tasks are stored in a flash memory not shown.

With reference to FIG. 12, a moving-image fetching process is executed in a step S1, and the continuous AF task is started up in a step S3. As a result of the process in the step S1, a through image is outputted from the LCD monitor 42, and as a result of the process in step S3, a focus is adjusted successively. In a step S5, it is determined whether or not a recording start operation is performed, and as long as NO is determined, an AE process in a step S7 is repeated. Thereby, an exposure amount is adjusted moderately. When the recording start operation is performed, the process advances to a step S9 in which the I/F 44 is started up in order to start a recording process. In a step S11, it is determined whether or not a recording end operation is performed, and as long as NO is determined, an AE process in a step S13 is repeated. When the recording end operation is performed, the process advances to a step S15 in which the I/F 44 is stopped in order to end the recording process. Upon completion of the process in the step S15, the process returns to the step S5.

With reference to FIG. 13, in a step S21, whether or not the vertical synchronization signal Vsync is generated is determined. When YES is determined, the minimum correlation values MIN_1 to MIN_5 are fetched from the motion detecting circuit 26 in a step S23. In a step S25, the total motion vector is created based on the fetched minimum correlation values MIN_1 to MIN_5. In a subsequent step S27, it is determined whether or not the motion of the imaging surface at the current time point is caused due to the pan/tilt movement based on the total motion vector. When YES is determined in this step, the process returns to the step S21 as it is, and when NO is determined, the process advances to a step S29. In the step S29, the description of the register RGST1 is updated so that the extraction area EX is placed at a position at which the total motion vector created in the step S25 is compensated. Upon completion of the process in the step S29, the process returns to the step S21.

With reference to FIG. 14, in a step S31, it is determined whether or not the zoom operation is performed, and when a determination result is updated from NO to YES, the target zoom magnification is calculated in a step S33. The target zoom magnification is calculated with reference to the zoom magnification at the current time point and the zoom operating manner. In a step S35, it is determined whether or not the calculated target zoom magnification is a settable magnification. When a determination result is NO, the process returns to the step S31, and when the determination result is YES, the process advances to a step S37. In the step S37, it is determined whether or not a process adapted to setting of the calculated target zoom magnification is either an optical zoom process or an electronic zoom process.

When the adaptable process is the optical zoom process, the process advances to a step S39, and in this step, the zoom lens 12 is moved to a position corresponding to the target zoom magnification. Upon completion of the process in the step S39, the process returns to the step S31. When the adaptable process is the electronic zoom process, the process advances to a step S41, and in this step, the electronic zoom magnification set to the zoom circuit 22z is adjusted to the target zoom magnification. In a step S43, the description (the size of the extraction area EX) of the register RGST1 is updated so as to be adapted to the adjusted electronic zoom magnification. In a step S45, the description (the sizes of the motion detection areas MD_1 to MD_5 and the manner of assigning the minute block SBK) of the register RGST2 is updated so as to be adapted to the adjusted electronic zoom magnification. Upon completion of the updating process in the step S45, the process returns to the step S31.

As can be seen from the above-described explanation, the simple Y generating circuit 24 repeatedly fetches the object scene image having the designated resolution. The register RGST2 assigns a plurality of minute blocks SBK, SBK, . . . , each of which has a representative point, to an object scene image in a manner to have an overlapping amount different depending on the magnitude of the designated resolution. The distributor 64 divides each of a plurality of images respectively corresponding to a plurality of minute blocks SBK, SBK, . . . , into a plurality of partial images by using the representative point as the base point. Each of the difference-absolute-value calculating circuits 74 to 80 calculates the difference absolute value expressing a difference in brightness between the pixel corresponding to the representative point and surrounding pixels, from each of the plurality of divided partial images. The minimum-correlation-value extracting circuit 84 creates the minimum correlation value MIN N equivalent to the motion information of the object scene image, based on the calculated difference absolute values.

Each of a plurality of images respectively corresponding to a plurality of minute blocks SBK, SBK, . . . is divided into a plurality of partial images by using the representative point as the base point, and the difference absolute value expressing the difference in brightness between the pixel corresponding to the representative point and the surrounding pixels is calculated from each of the partial images. In this way, it becomes possible to avoid a situation in which a load charged on calculation of the difference absolute value increases caused due to an increase in overlapping amount of a plurality of minute blocks SBK, SBK, . . . . Thereby, it becomes possible to inhibit a decrease in motion detecting capability caused due to variation in resolution.

Figure 15:
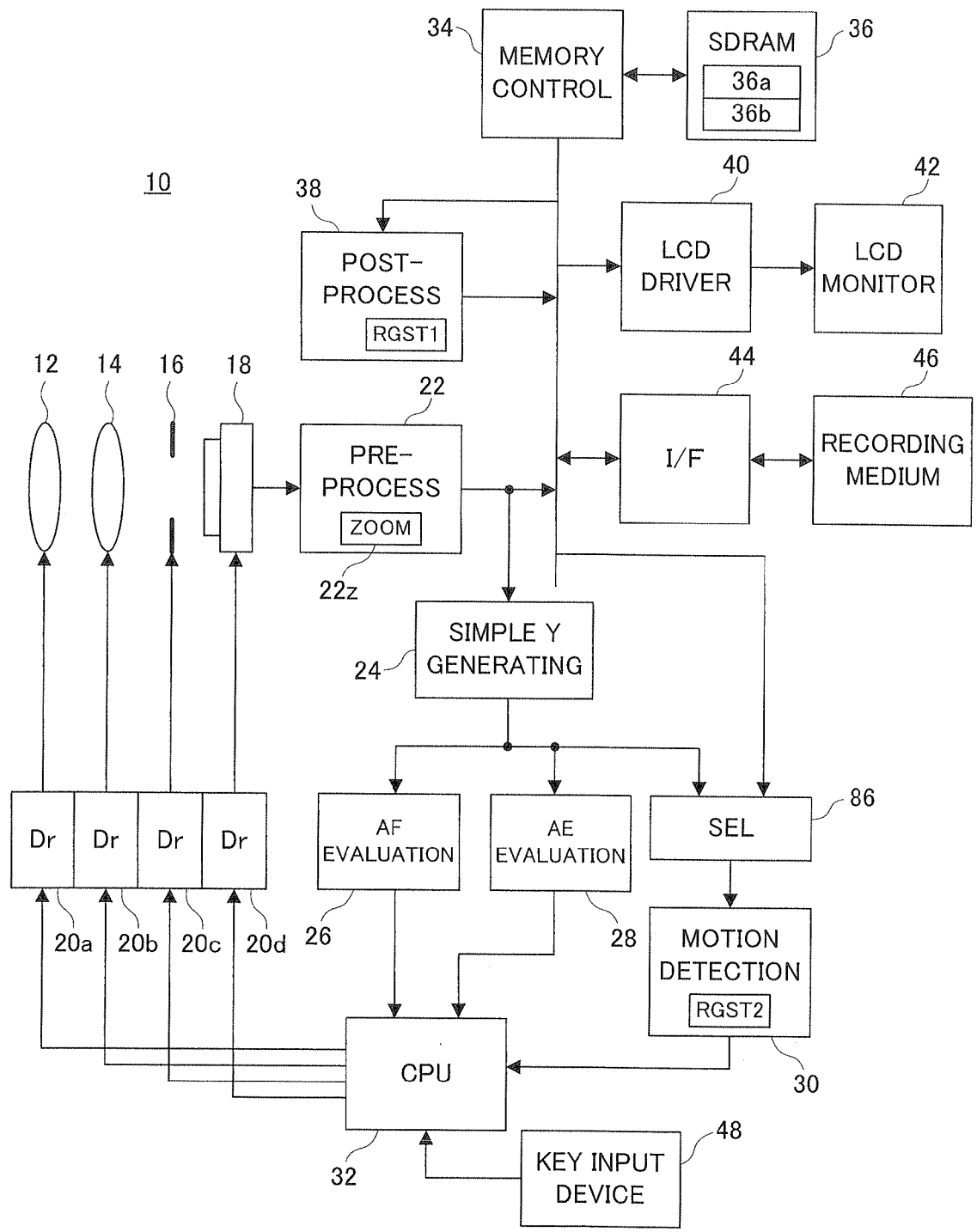
FIG. 15 is a block diagram showing a configuration of another embodiment.

It is noted that in this embodiment, the motion detecting circuit 30 is started up in an imaging mode. However, optionally, the motion detecting circuit 30 may be additionally started up in a reproduction mode in which the moving image recorded on the recording medium 46 is reproduced. In this case, however, the size of the extraction area EX in the reproduction mode needs to be made smaller than the size of the extraction area EX in the imaging mode. Moreover, as shown in FIG. 15, it is necessary that a selector 86 is arranged in a previous stage of the motion detecting circuit 30 and the selector 86 is caused to select reproduction image data in a camera mode.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motion detecting apparatus, comprising:
   a fetcher which repeatedly fetches an object scene image having a designated resolution;
   an assigner which assigns a plurality of areas, each of which has a representative point to the object scene image, in a manner to have an overlapping amount different depending on a magnitude of the designated resolution;
   a divider which divides each of a plurality of images respectively corresponding to the plurality of areas assigned by said assigner, into a plurality of partial images, by using the representative point as a base point;
   a detector which detects a difference in brightness between a pixel corresponding to the representative point and surrounding pixels, from each of the plurality of partial images divided by said divider; and
   a creator which creates motion information indicating a motion of the object scene image fetched by said fetcher, based on a detection result of said detector.

2. A motion detecting apparatus according to claim 1, wherein said assigner includes an adjustor which adjusts a manner of assigning the plurality of areas so that the overlapping amount increases according to a decrease in the designated resolution.

3. A motion detecting apparatus according to claim 2, further comprising a changer which changes the magnitude of the designated resolution in response to a zoom operation.

4. A motion detecting apparatus according to claim 2, wherein each of the plurality of areas is equivalent to a rectangle block having a horizontal side and a vertical side, the plurality of areas are arrayed along the horizontal direction and/or vertical direction of the object scene image, and said adjustor executes an adjusting process by using a half of an area size in an array direction as an upper limit of the overlapping amount in the array direction.

5. A motion detecting apparatus according to claim 1, wherein said detector including a plurality of difference detectors respectively corresponding to the plurality of partial images.

6. A motion detecting apparatus according to claim 1, further comprising a processor which executes a motion correcting process based on the motion information created by said creator.

7. A motion detecting apparatus according to claim 6, further comprising an extractor which extracts a partial object scene image belonging to an extraction area, out of the object scene image, wherein the motion correcting process includes a process for changing a position of the extraction area so that the motion indicated by the motion information created by said creator is compensated.

\* \* \* \* \*